US010363885B2

United States Patent
Tang

(10) Patent No.: US 10,363,885 B2
(45) Date of Patent: Jul. 30, 2019

(54) AUTOMOBILE REARVIEW MIRROR WITH DRIVING VIDEO RECORDING FUNCTION

(71) Applicant: INVENTEL PRODUCTS, LLC, Rockaway, NJ (US)

(72) Inventor: Jack Tang, New Taipei (TW)

( * ) Notice: Subject to any disclaimer, the term of this patent is extended or adjusted under 35 U.S.C. 154(b) by 103 days.

(21) Appl. No.: 15/253,127

(22) Filed: Aug. 31, 2016

(65) Prior Publication Data

US 2018/0020139 A1    Jan. 18, 2018

(30) Foreign Application Priority Data

Jul. 18, 2016   (TW) .............................. 105210770 U

(51) Int. Cl.
| | |
|---|---|
| B60R 11/04 | (2006.01) |
| B60Q 1/00 | (2006.01) |
| B60R 1/04 | (2006.01) |
| B60R 1/08 | (2006.01) |
| B60R 11/02 | (2006.01) |
| B60R 1/12 | (2006.01) |
| B60R 11/00 | (2006.01) |
| H04N 5/225 | (2006.01) |
| H04N 5/33 | (2006.01) |

(Continued)

(52) U.S. Cl.
CPC ............ B60R 11/04 (2013.01); B60Q 1/0023 (2013.01); B60R 1/04 (2013.01); B60R 1/08 (2013.01); B60R 11/0211 (2013.01); H04N 5/2252 (2013.01); H04N 5/2256 (2013.01); H04N 5/332 (2013.01); H04N 5/76 (2013.01); *H04N 5/77* (2013.01); *B60R 2001/1253* (2013.01); *B60R 2011/0033* (2013.01)

(58) Field of Classification Search
USPC .................................................. 403/122–144
See application file for complete search history.

(56) References Cited

U.S. PATENT DOCUMENTS

| 1,831,086 | A | * | 11/1931 | Zerk | ...................... F16M 11/14 248/181.1 |
| 2,325,615 | A | * | 7/1943 | La Hodny | ............... B60R 1/086 248/122.1 |

(Continued)

FOREIGN PATENT DOCUMENTS

| CN | 202656964 U | * | 1/2013 |
| JP | 2003276507 A | * | 10/2003 |
| TW | M328981 U | | 3/2008 |

Primary Examiner — Tyler W. Sullivan
(74) Attorney, Agent, or Firm — Jeffrey Lubin, Esq.

(57) ABSTRACT

An automobile rearview mirror is provided having a driving video recording function that includes a rearview mirror body. The body has a housing, a mirror, a first pivot holder and a second pivot holder mounted at the housing and respectively defined therein is a ball socket and a position-limiting passage. The passage is an open-ended passage disposed in communication with the ball socket and having an inner diameter gradually increased toward an open end thereof. A camera module is provided which includes a camera holder, an image capture device mounted in the camera holder for capturing images. A connection rod extends from the camera holder and is inserted through the position-limiting passage to suspend the camera holder outside the rearview mirror body and has a ball located at an inner end thereof that couples to the ball socket of the first pivot holder.

6 Claims, 13 Drawing Sheets

(51) Int. Cl.
*H04N 5/76* (2006.01)
*H04N 5/77* (2006.01)

(56) References Cited

U.S. PATENT DOCUMENTS

| | | | | |
|---|---|---|---|---|
| 2,328,330 A * | 8/1943 | Edington | ............ | F16C 11/0609 403/139 |
| 2,862,419 A * | 12/1958 | Pryor | ........................ | B60R 1/06 248/481 |
| 3,211,405 A * | 10/1965 | Alfred | .................... | F16M 11/14 248/168 |
| 3,427,094 A * | 2/1969 | Brighton | ................. | B60R 1/086 359/606 |
| 3,988,558 A * | 10/1976 | Josemans | ............ | H01H 23/146 200/335 |
| 4,159,866 A * | 7/1979 | Wunsch | .................. | B60R 1/025 359/876 |
| 4,515,336 A * | 5/1985 | Fischer | ............... | F16C 11/0619 248/288.51 |
| 4,928,546 A * | 5/1990 | Walters | .................... | A61F 2/585 403/122 |
| 6,693,519 B2 * | 2/2004 | Keirstead | ................. | B60R 1/00 340/435 |
| 6,795,111 B1 * | 9/2004 | Mazzilli | .................... | B60R 1/12 348/118 |
| 7,197,965 B1 * | 4/2007 | Anderson | ............. | B25B 13/481 81/177.9 |
| 2002/0130953 A1 * | 9/2002 | Riconda | ................. | G01C 21/36 348/115 |
| 2002/0159270 A1 * | 10/2002 | Lynam | ................... | B60K 35/00 362/492 |
| 2003/0117728 A1 * | 6/2003 | Hutzel | ................... | B60R 1/008 359/838 |
| 2011/0115911 A1 * | 5/2011 | Fang | ........................ | B60R 1/04 348/148 |
| 2013/0321628 A1 * | 12/2013 | Eng | ........................... | B60R 1/00 348/148 |
| 2016/0049726 A1 * | 2/2016 | Fukuda | ................... | H01Q 1/18 342/359 |
| 2016/0332572 A1 * | 11/2016 | Gibeau | .................... | B60R 1/00 |

* cited by examiner

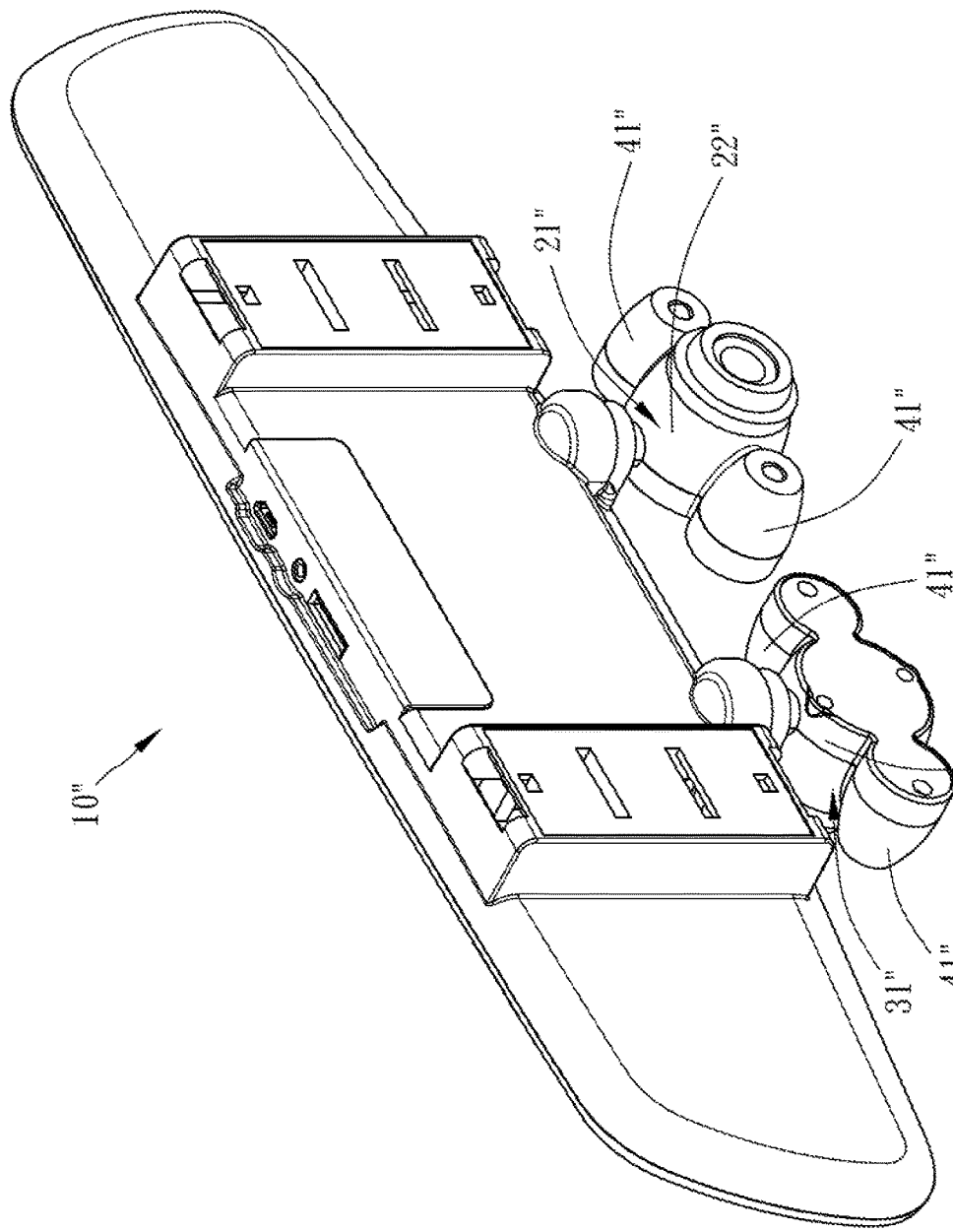

AUTOMOBILE REARVIEW MIRROR WITH DRIVING VIDEO RECORDING FUNCTION

BACKGROUND OF THE INVENTION

1. Field of the Invention

The present invention relates to automobile rearview technology and more particularly, to an automobile rearview mirror with driving video recording function 2. Description of the Related Art In order to protect the safety of oneself and other during driving, it has become popular to install a driving recorder in a rear-view mirror. Taiwan Patent Publication M328981 discloses a road speed limit sensor-incorporated driving video recorder assembly, which comprises an auxiliary rear-view mirror, a driving video recorder main body embedded in the auxiliary rear-view mirror and consisting of a video camera, a control switch, a control substrate and a display device, and a camera lens mounted at the bottom side of the auxiliary rear-view mirror. The camera lens has one end thereof mounted with a universal connector. The universal connector has an opposite end thereof connected to a holder plate and pivot block at the bottom side of the auxiliary rear-view mirror. The control substrate controls the camera lens to bias to different directions or angles.

According to the aforesaid prior art design, the video image capturing angle of the camera lens is freely adjustable. However, when adjusting the left and right inclination angle of the camera lens, it is often easy to rotate too far, causing a horizontal skew in the image. In this regard, if we can provide a mechanism for limiting the angle adjustment range, the aforesaid problem can be effectively improved.

SUMMARY OF THE INVENTION

The present invention has been accomplished under the circumstances in view. It is the main object of the present invention to provide an automobile rearview mirror with driving video recording function, which uses a position-limiting passage to limit the angle of inclination of the camera module to a predetermined range.

To achieve this and other objects of the present invention, an automobile rearview mirror with driving video recording function comprises a rearview mirror body and a first camera module. The rearview mirror body comprises a housing and a mirror mounted in the housing. The housing comprises a first pivot holder and a second pivot holder. The first pivot holder and the second pivot holder each define therein a ball socket and a position-limiting passage in communication with the ball socket. Each position-limiting passage is an open-ended passage facing downwards and having an inner diameter gradually increased toward an open end thereof. The first camera module comprises a camera holder, an image capture device mounted in the camera holder and adapted for capturing outside video images, a connection rod extended from a top side of the camera holder and terminating in a ball. The ball is coupled to the ball socket of the first pivot holder in a tight-fit manner so that the ball is rotatable relative to the ball socket to the desired angular position by an external force and then positively positioned in the adjusted angular position after the external force is disappeared. The connection rod is extended through the position-limiting passage to a certain distance outside the rearview mirror body to suspend the camera holder outside the rearview mirror body.

Although the ball is coupled to the ball socket in a tight manner, the ball can also contain a pin protrusion and the ball socket can also contain a corresponding pin opening which is has sufficient room to permit the ball to rotate as desired in nearly all direction subject to the limitations of the position-limiting passage. Nevertheless, in one location on the ball socket, there is no pin opening, but rather a pin arresting surface so that as the ball is rotated around the axis defined by the rod hanging down perpendicularly to the mirror (the Yaw axis) the pin will eventually come into contact and its continued movement in that direction be arrested by the pin arresting surface, and the camera will only be able to rotate a maximum of essentially 360°. The ball within the ball socket therefore cannot be rotated more than 360° around the yaw axis. This provides a benefit of preventing the wires inside the housing from twisting too much due to unintended over rotation.

Thus, the automobile rearview mirror with driving video recording function in accordance with the present invention can effectively overcome the problems encountered in conventional techniques, allowing the user to adjust the angular position of the first camera module and using the position-limiting passage to limit the image capturing angle of the image capture device to a predetermined range.

Other advantages and features of the present invention will be fully understood by reference to the following specification in conjunction with the accompanying drawings, in which like reference signs denote like components of structure.

BRIEF DESCRIPTION OF THE DRAWINGS

FIG. 13 is an oblique rear elevational view of the automobile rearview mirror with driving video recording function in accordance with the third embodiment of the present invention.

DETAILED DESCRIPTION OF THE INVENTION

Figure 1:
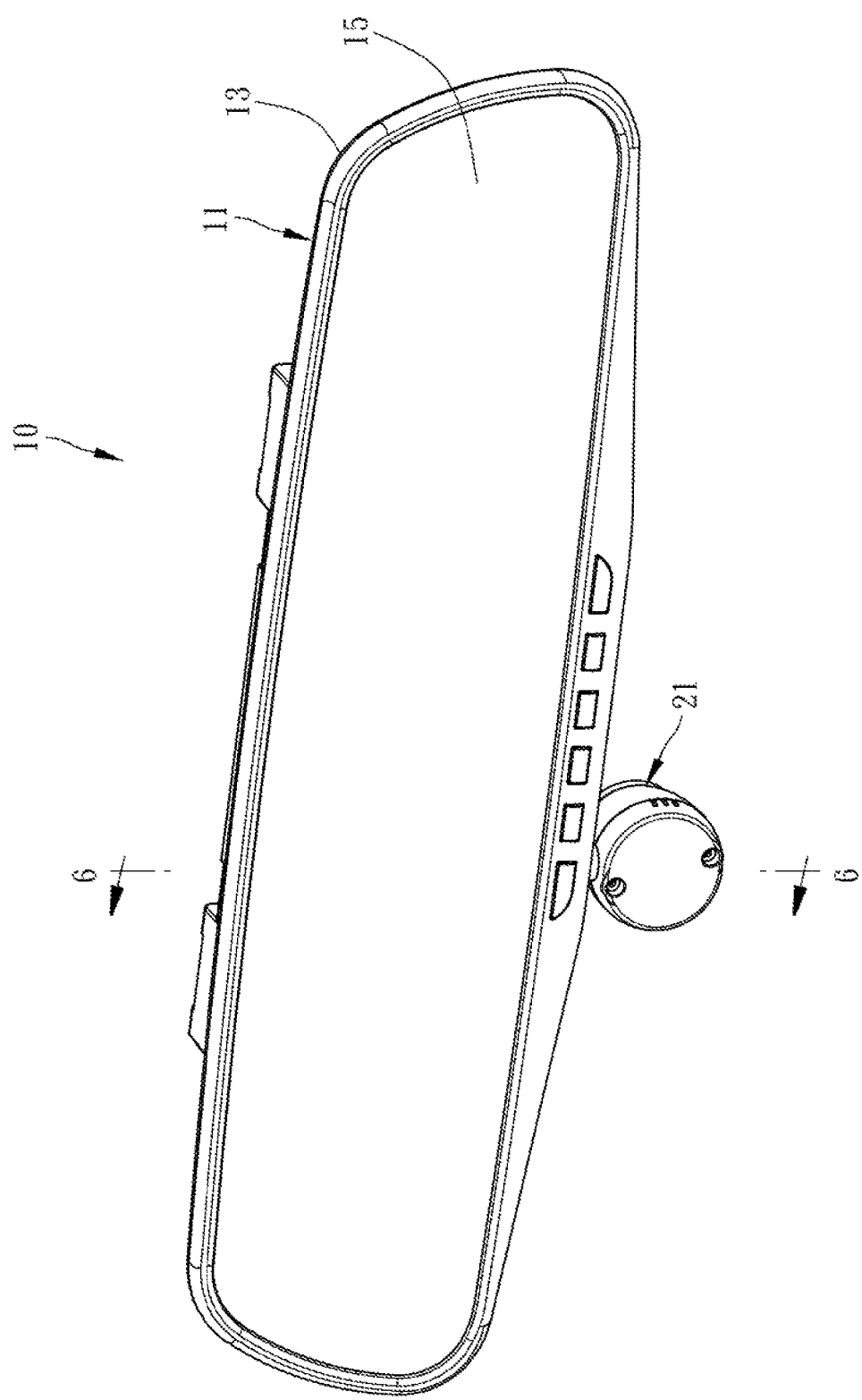
FIG. 1 is an oblique front elevational view of an automobile rearview mirror with driving video recording function in accordance with a first embodiment of the present invention.
Figure 2:
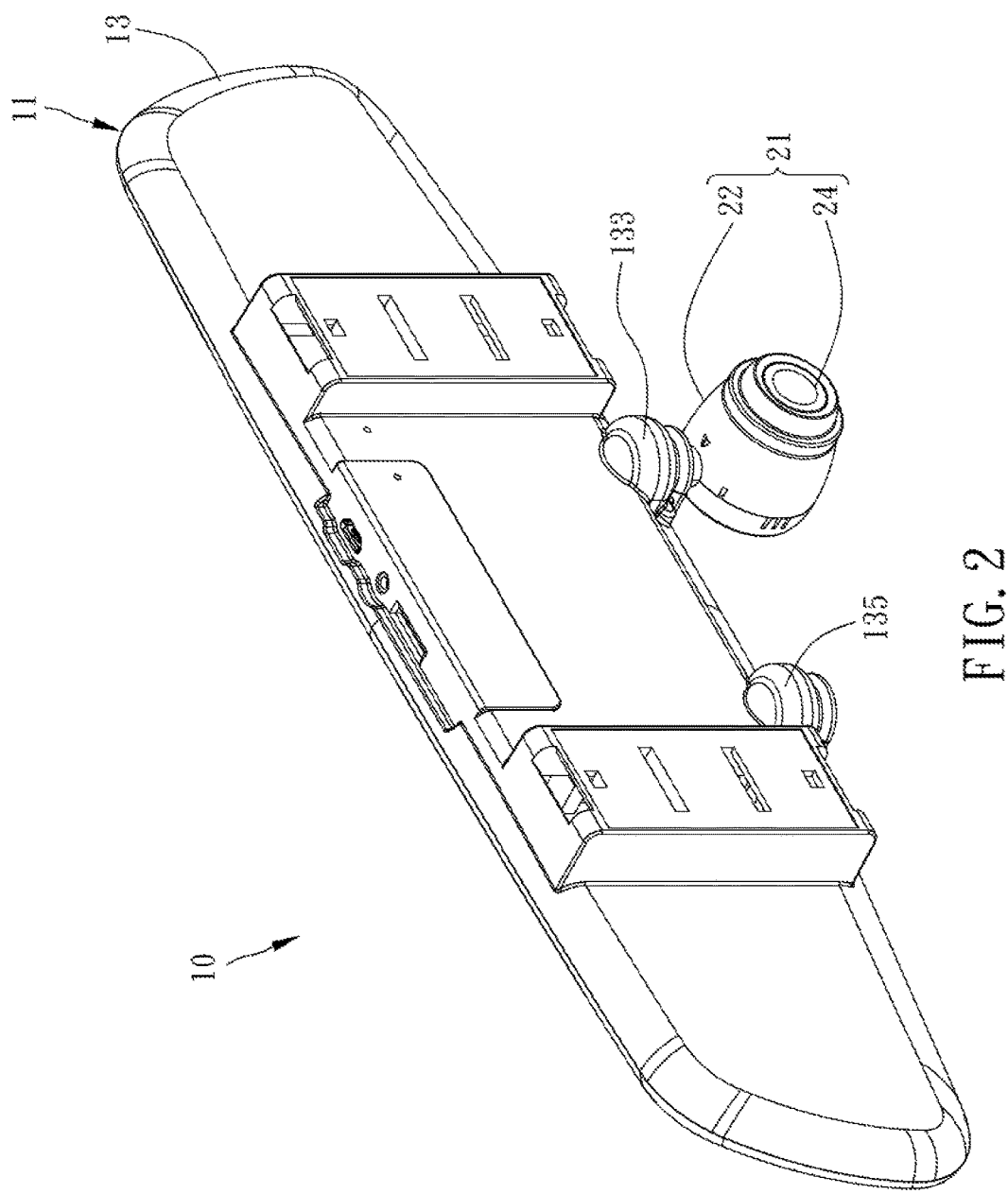
FIG. 2 is an oblique rear elevational view of the automobile rearview mirror with driving video recording function in accordance with the first embodiment of the present invention.
Figure 3:
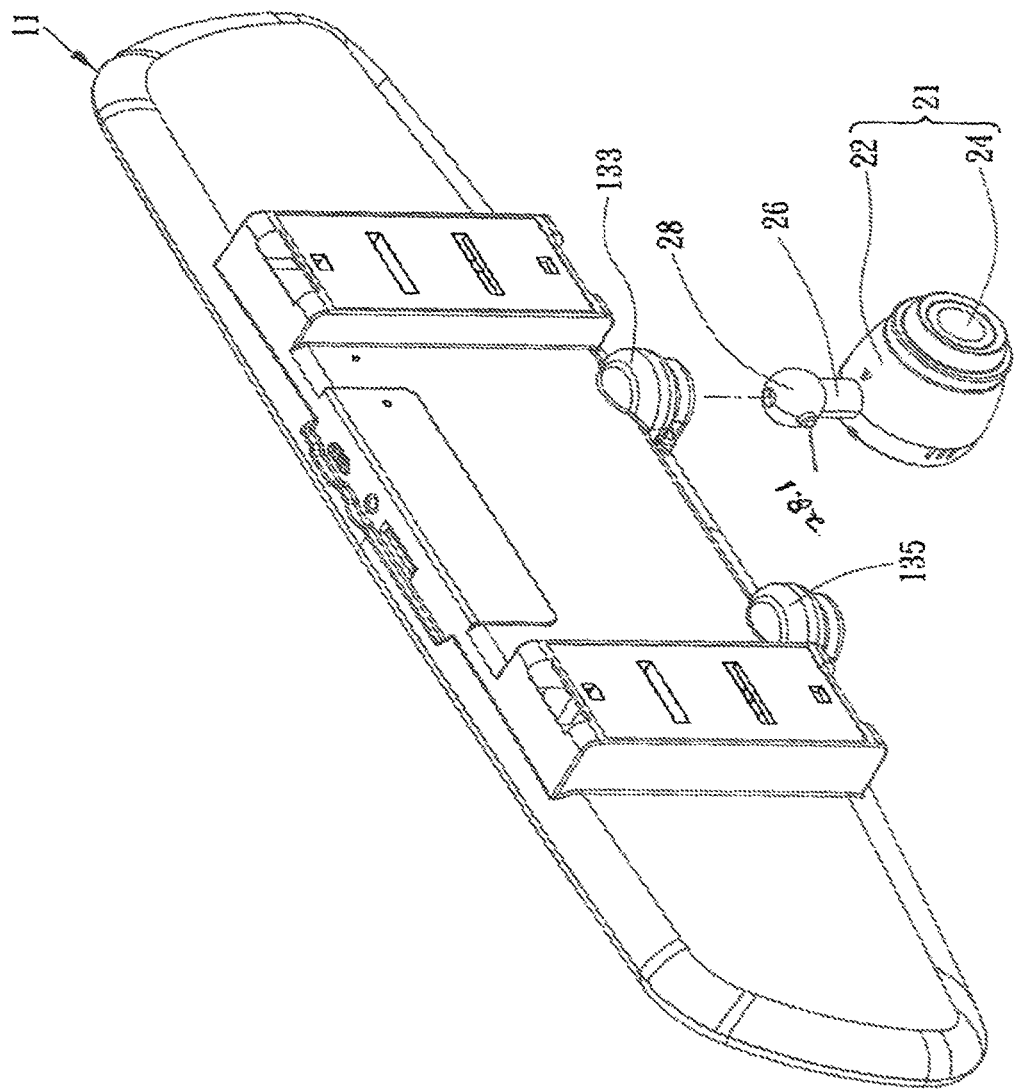
FIG. 3 is an exploded view of the automobile rearview mirror with driving video recording function in accordance with the first embodiment of the present invention.
Figure 4:
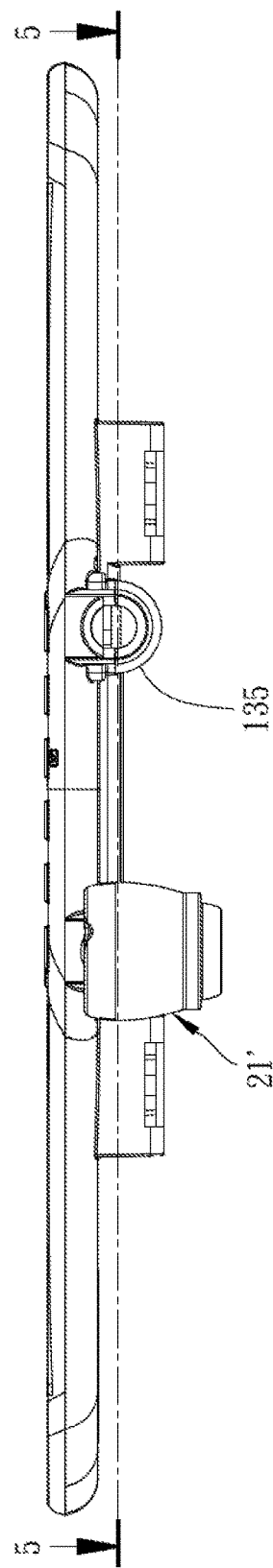
FIG. 4 is a bottom view of the automobile rearview mirror with driving video recording function in accordance with the first embodiment of the present invention.
Figure 5:
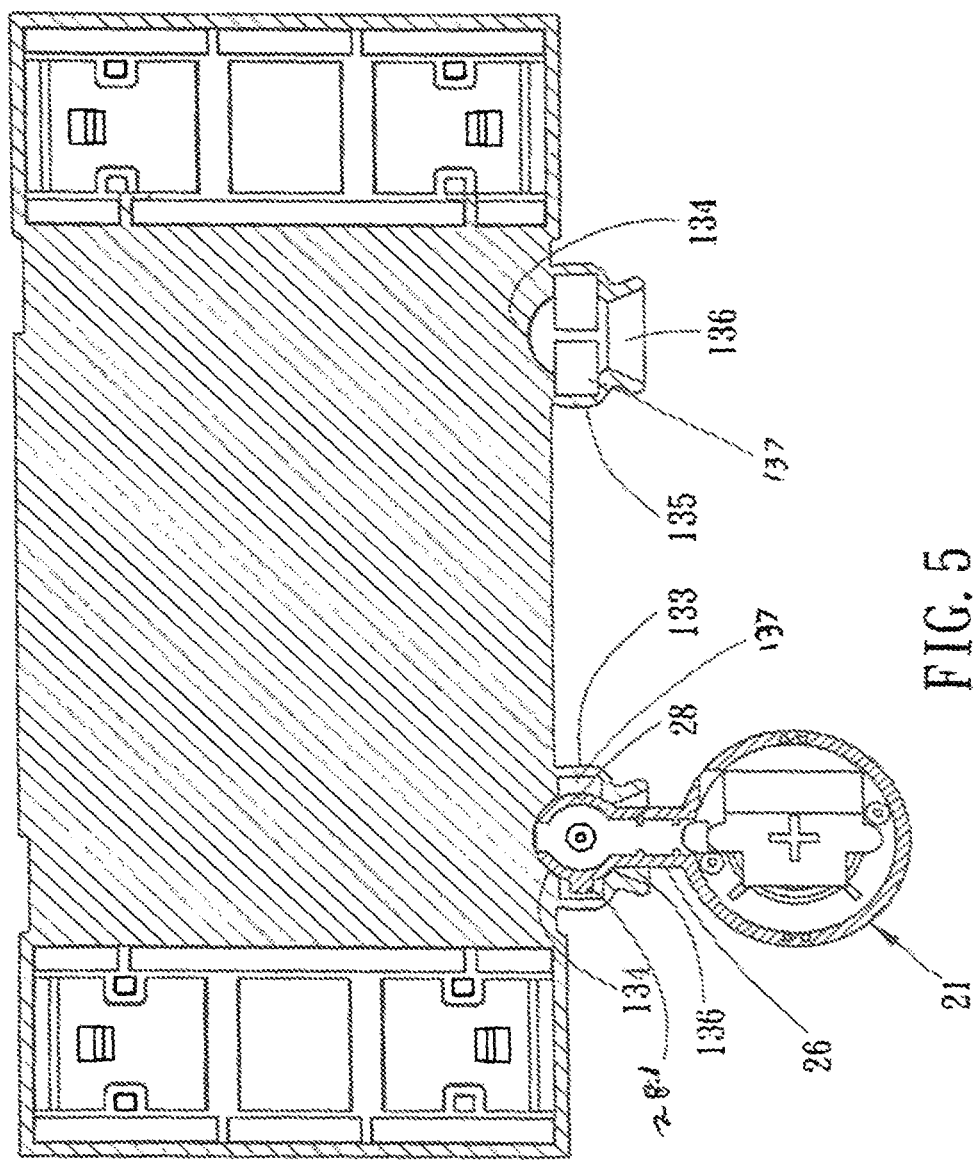
FIG. 5 is a sectional view taken along line 5-5 of FIG. 4.

Referring to FIGS. 1-7, an automobile rearview mirror with driving video recording function in accordance with a first embodiment of the present invention is shown. The automobile rearview mirror with driving recording function 10 mainly comprises a rearview mirror body 11 and a first camera module 21.

The rearview mirror body 11 comprises a housing 13 and a mirror 15. The mirror 15 is mounted in the housing 13. The housing 13 comprises a first pivot holder 133 and a second pivot holder 135. The first pivot holder 133 and the second pivot holder 135 each define therein a ball socket 134 and a position-limiting passage 136 in communication with the ball socket 134. The position-limiting passage 136 is an open-ended passage facing downwards, having an inner diameter gradually increased toward the open end thereof.

The first camera module 21 comprises a camera holder 22, an image capture device 24 mounted in the camera holder 22 and adapted for capturing outside video images, and a connection rod 26 extended from a top side of the camera holder 22 and terminating in a ball 28 that is coupled to the ball socket 134 of the first pivot holder 133 in a tight-fit manner so that the ball 28 can be rotated relative to the ball socket 134 to the desired angular position by an external force and then positively positioned in the adjusted angular position after the external force is disappeared. The connection rod 26 extends through the position-limiting passage 136 to a certain distance outside the rearview mirror body 11 and connected to the camera holder 22 that is suspended outside the rearview mirror body 11.

Figure 6:
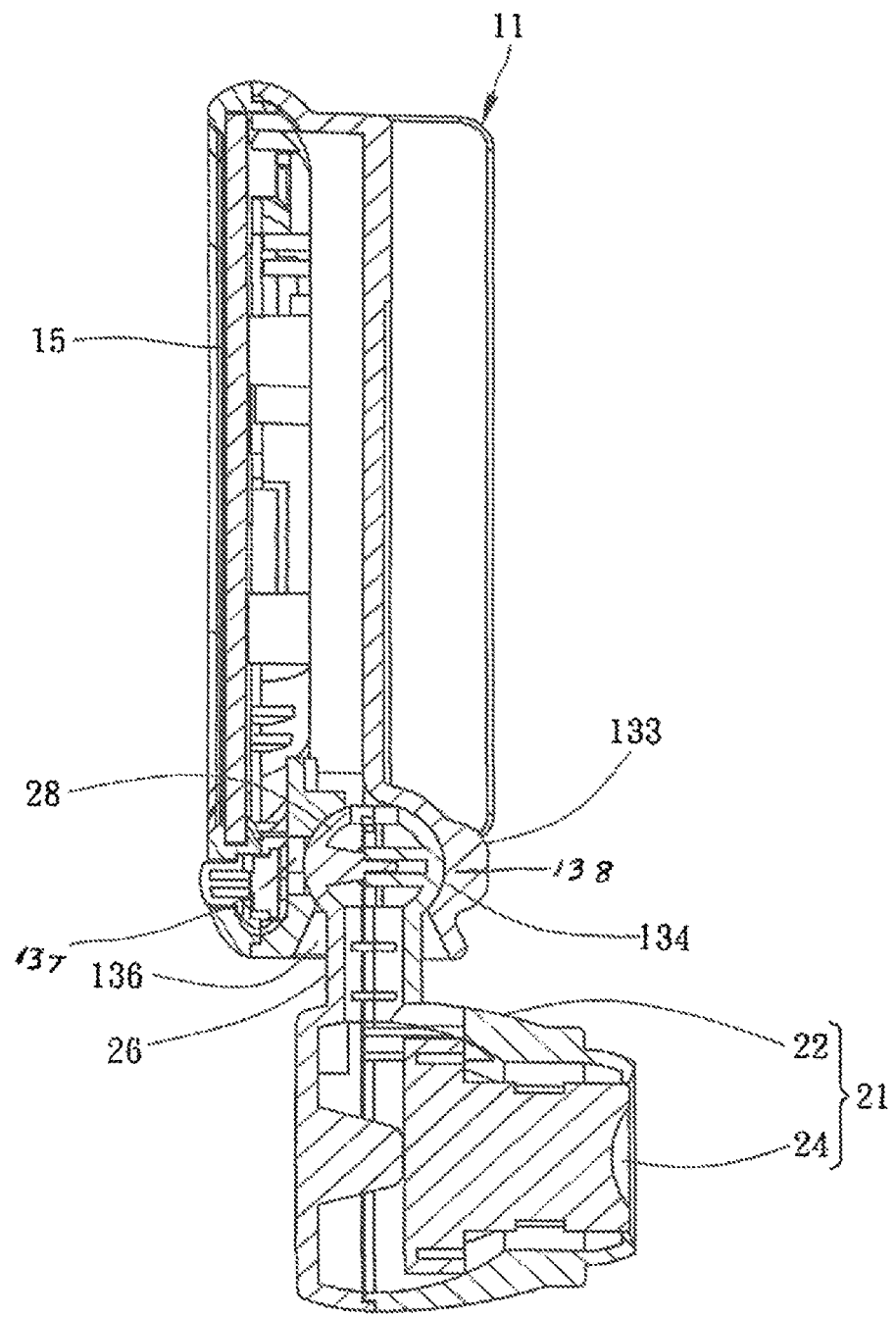
FIG. 6 is a sectional view taken along line 6-6 of FIG. 1.
Figure 7:
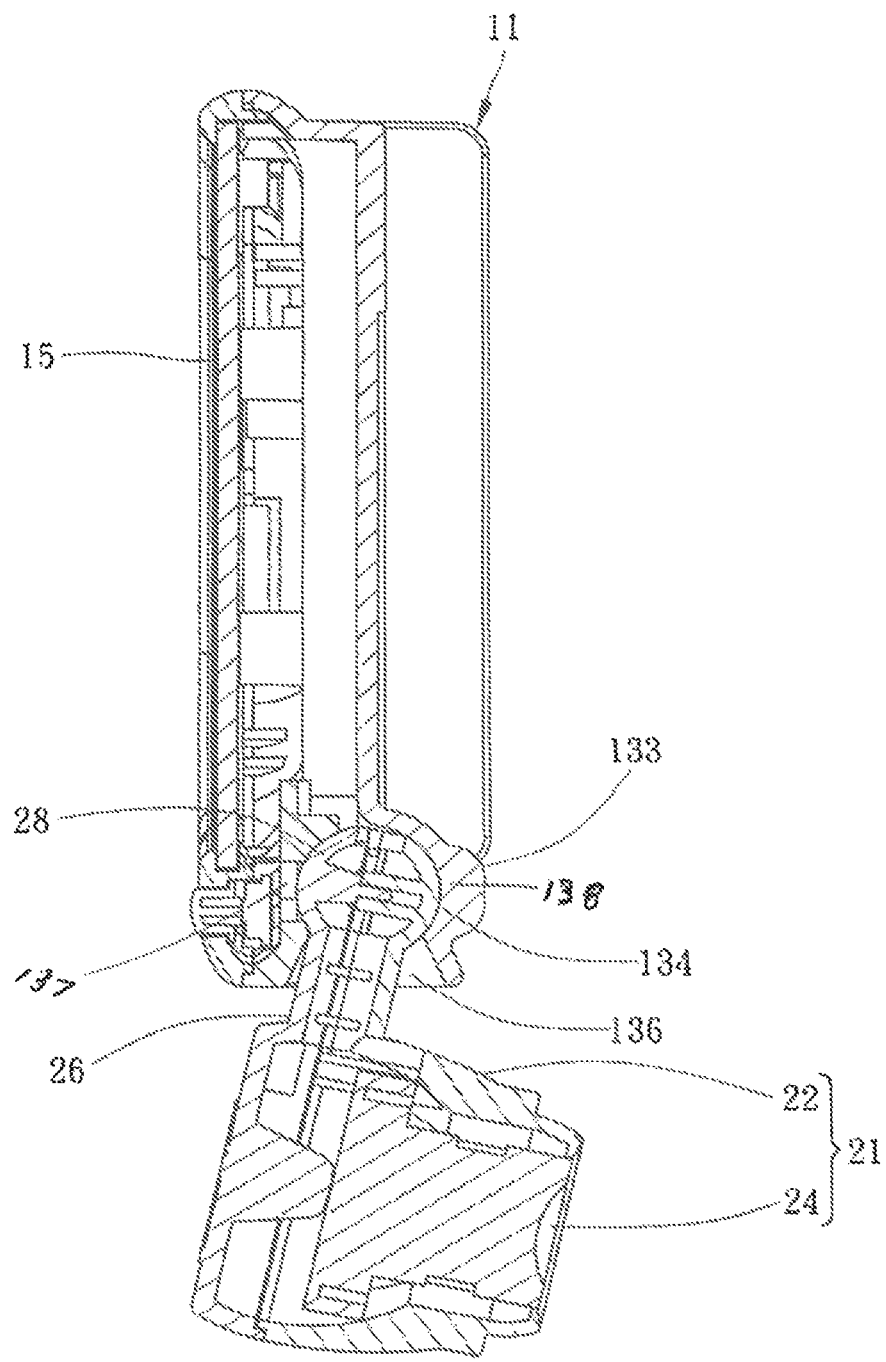
FIG. 7 is a schematic drawing illustrating adjustment of the angular position of the first camera module relative to the housing of the rearview mirror body.
Figure 8:
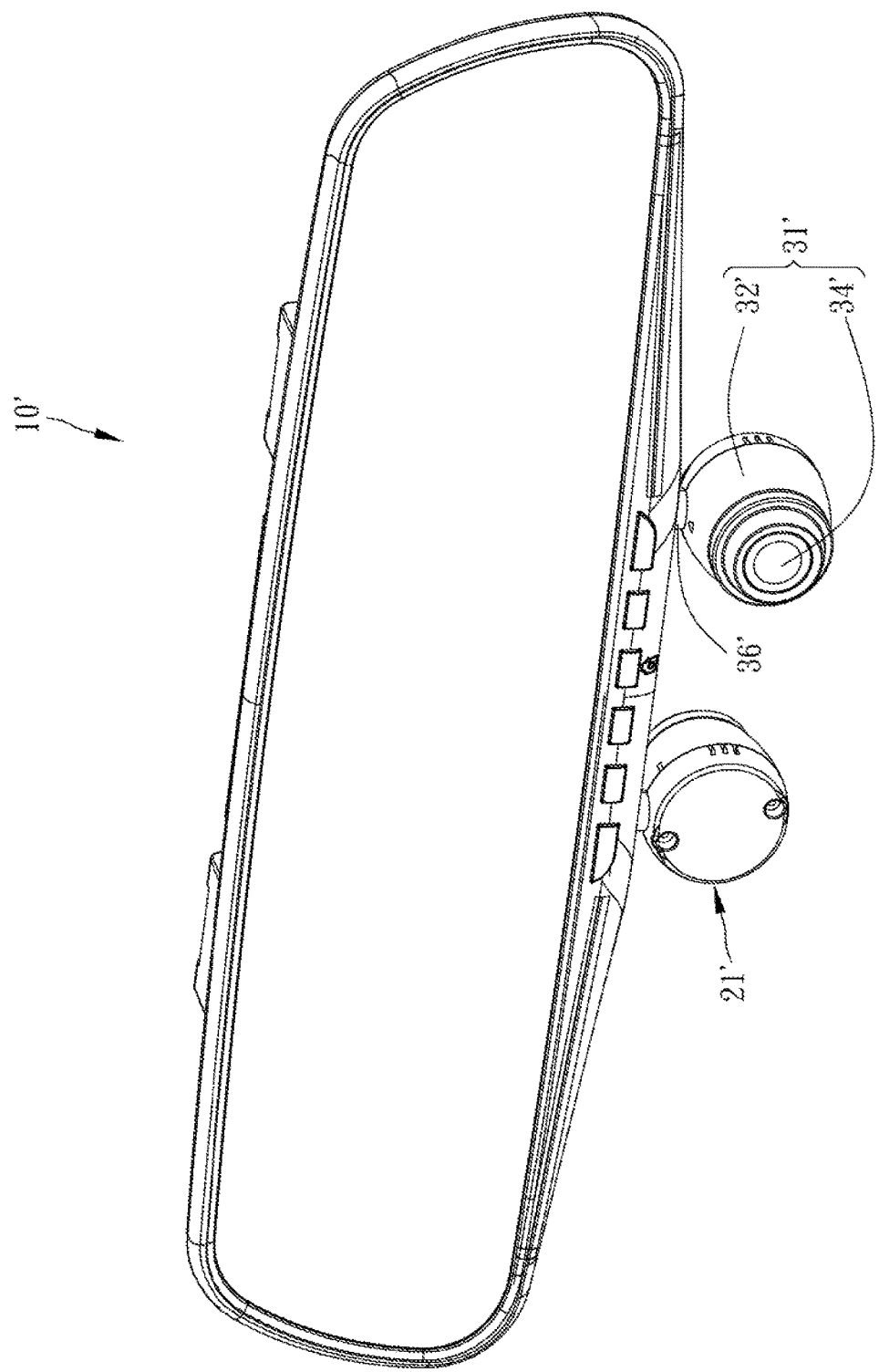
FIG. 8 is an oblique front elevational view of an automobile rearview mirror with driving video recording function in accordance with a second embodiment of the present invention.
Figure 9:
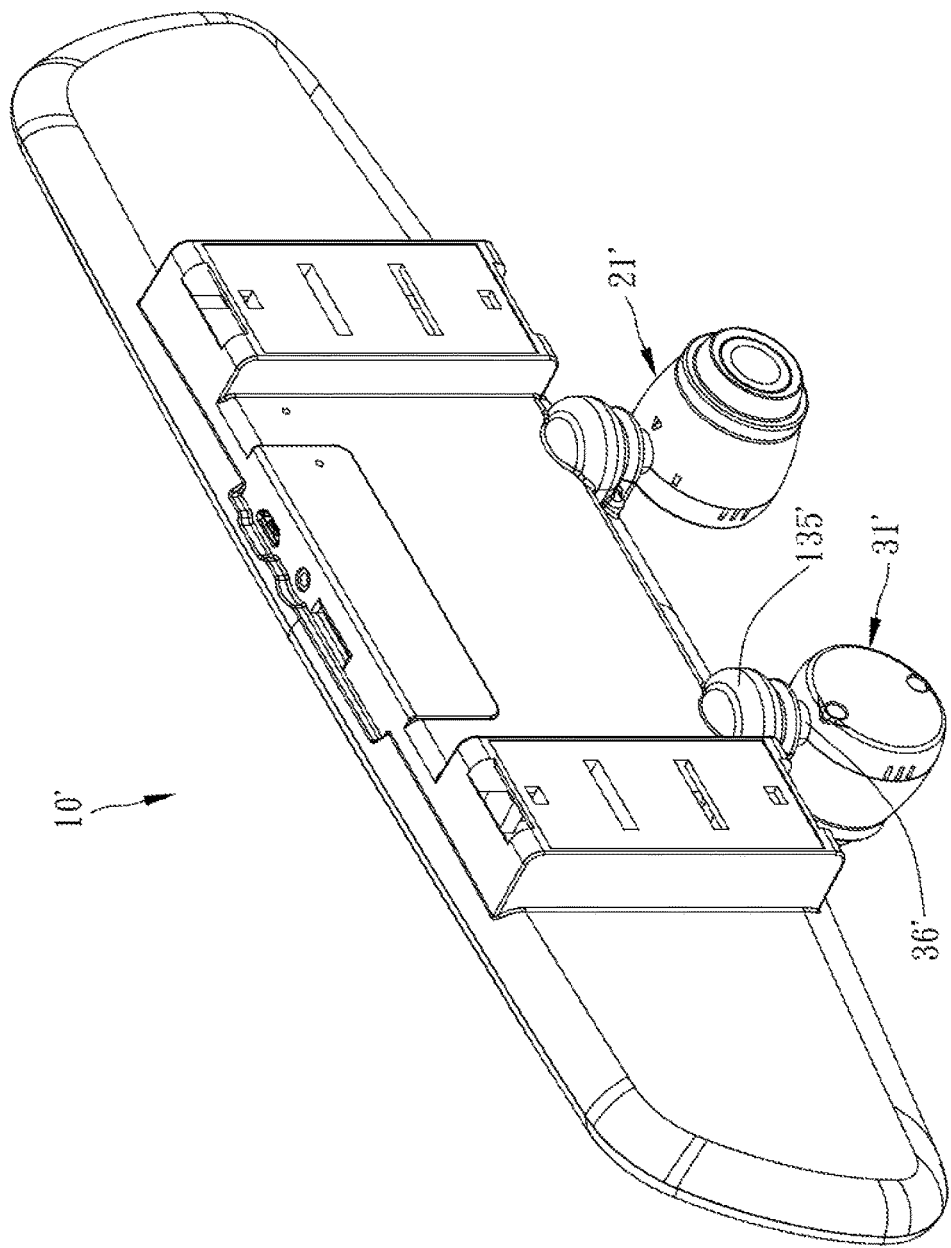
FIG. 9 is an oblique rear elevational view of the automobile rearview mirror with driving video recording function in accordance with the second embodiment of the present invention.
Figure 10:
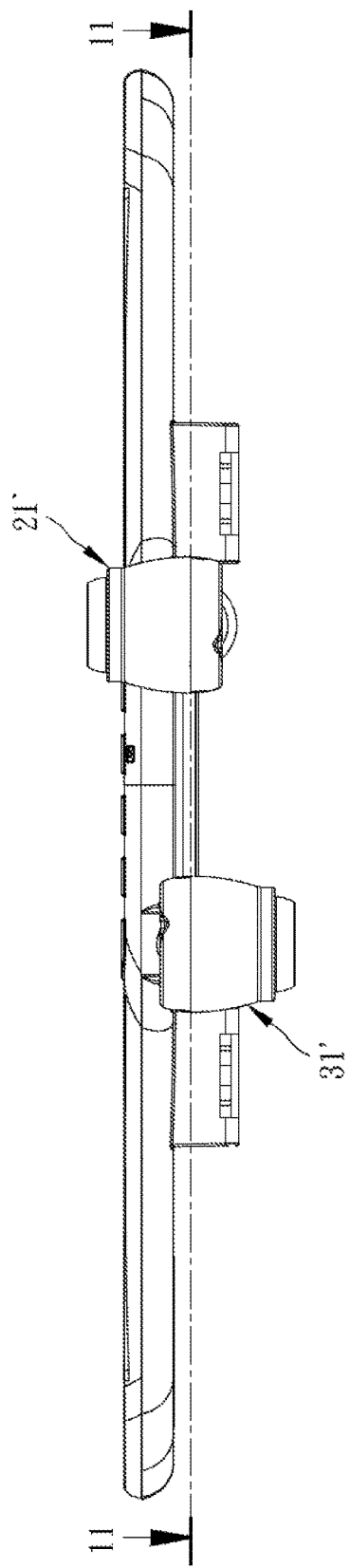
FIG. 10 is a bottom view of the automobile rearview mirror with driving video recording function in accordance with the second embodiment of the present invention.
Figure 11:
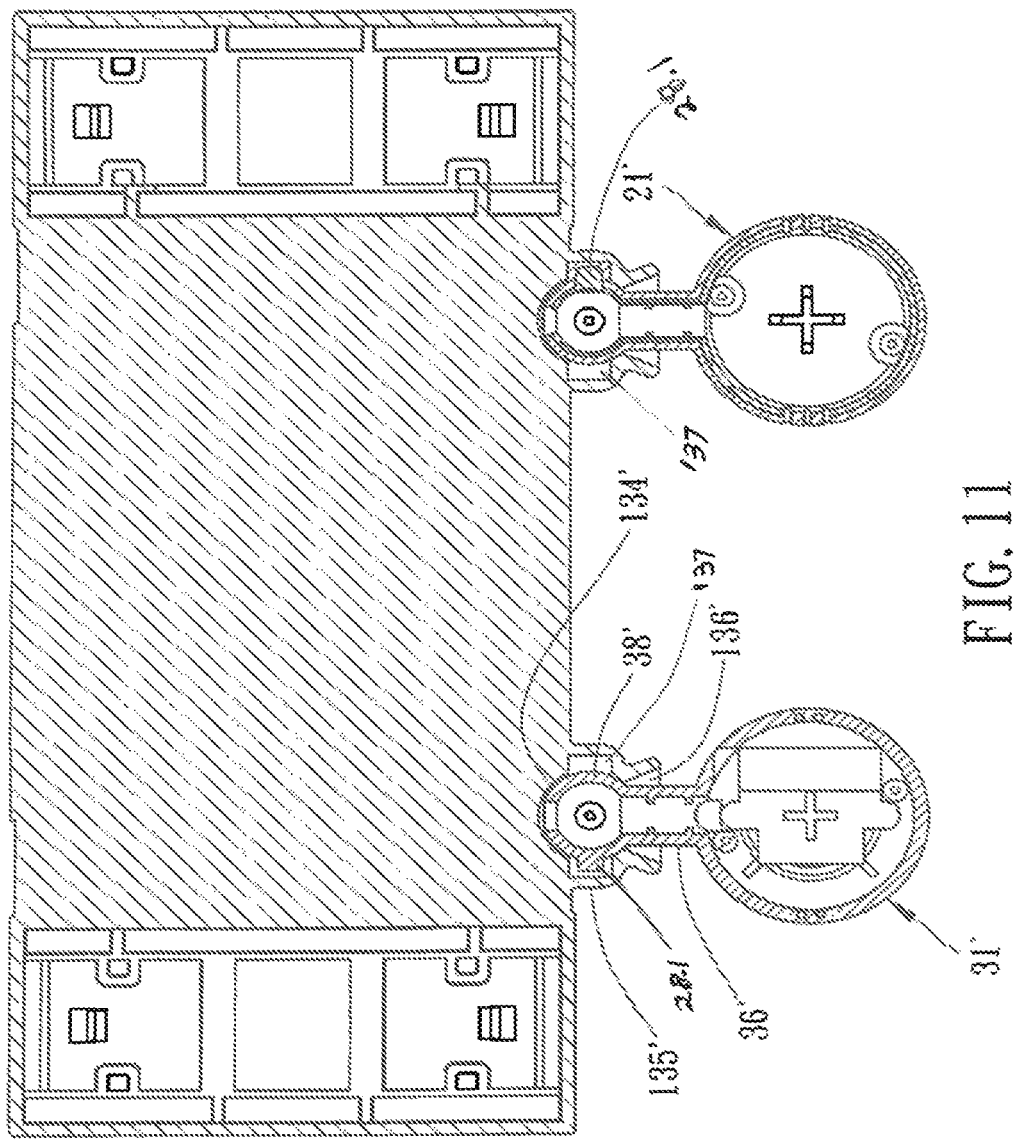
FIG. 11 is a sectional view taken along line 11-11 of FIG. 10.

The Ball 28 can have a pin protrusion 28.1 on one side. Corresponding to the pin protrusion 28.1 on the ball 28, the ball socket 134 can have a pin opening 137. The ball socket 134 can also have a pin arresting surface 138 which is a vertical surface, following the contour of the ball 28 along only one location on the ball socket as shown in FIGS. 6 and 7 and which is sufficiently in communication with the ball 28, such that when the camera and therefore the ball 28 is sufficiently rotated around the yaw axis, the pin protrusion will contact, and its further movement around the yaw axis will be arrested by the pin arresting surface such that it will not be possible to continue rotating the ball, and consequently the camera, in the same direction around the Yaw axis. It is noted that the thinner the pin protrusion and the pin arresting surface are, the more the camera will be able to rotate around the yaw axis towards a maximum of essentially 360°.

The pin opening 137 is wide enough to permit full movement of the ball 28 relative to the ball socket 134 subject only to the limitations provided by the position limiting passage 136 in conjunction with the connection rod 26; and further subject to the limitation described above with regard to the pin arresting surface 138. It is noted that the wider the positioning limiting passage is, more roll (pivoting left and right around an axis ("roll axis") running through the center of the camera lens when it faces in the same direction as the surface of the mirror, which roll axis is also perpendicular to the surface of the mirror) and pitch (pivoting forward and back around an axis ("pitch axis") running laterally through camera when it is hanging directly straight down from the mirror, which pitch axis is parallel to the surface of the mirror) can be achieved, so that a wider position limiting passage will permit both greater Roll and greater Pitch off the neutral position (which is defined as the camera hanging perpendicularly down from the mirror).

FIG. 7 depicts the camera module 21 being maintained in position such that the rod 26 reaches the sidewall of the position limiting passage 136. As discussed on page 2, lines 16-20 of this specification, it is the tight-fit manner of the coupling of the ball 28 to ball socket 134 that permits the camera module 21 to be maintained in said position after external force is disappeared.

After explanation of the structural details of the first embodiment of the present invention, the application of the automobile rearview mirror with driving video recording function in accordance with the first embodiment of the present invention is outlined hereinafter.

Referring to FIGS. 6 and 7 and FIG. 1 again, when using the automobile rearview mirror with driving video recording function 10 in accordance with the first embodiment of the present invention, mount the automobile rearview mirror with driving video recording function 10 on the inside of a car, enabling the mirror 15 to reflect video images behind the car (not shown). Before driving the car, the user can adjust the camera holder 22 of the first camera module 21 to the desired image capturing angle. Because the connection rod 26 extends through the position-limiting passage 136, the body of the connection rod 26 will be abutted against the inner wall of the position-limiting passage 136 when the user adjusts the angular position of the camera holder 22 of the first camera module 21, achieving a position-limiting effect. Thus, when the user adjusts the angular position of the camera holder 22 of the first camera module 21, the left inclination angle and right inclination angle can be restricted to overcome the problems encountered in conventional techniques.

Thus, the automobile rearview mirror with driving video recording function 10 in accordance with the first embodiment of the present invention can effectively overcome the problems encountered in conventional techniques, allowing the user to adjust the angular position of the first camera module 21 and using the position-limiting passage 136 to limit the image capturing angle of the image capture device 24 to a predetermined range.

Referring to FIGS. 8-11, an automobile rearview mirror with driving video recording function 10' in accordance with a second embodiment of the present invention is shown. This second embodiment is substantially similar to the aforesaid first embodiment with the exceptions as follows:

This second embodiment further comprises a second camera module 31'. The second camera module 31' comprises a camera holder 32', an image capture device 34', mounted in the camera holder 32' and adapted for capturing outside video images, and a connection rod 36' extended from a top side of the camera holder 32' and terminating in a ball 38' that is coupled to the ball socket 134' of the second pivot holder 135' in a tight-fit manner so that the ball 38' can be rotated relative to the ball socket 134' to the desired angular position by an external force and then positively positioned in the adjusted angular position after the external force is disappeared. The connection rod 36' extends through the position-limiting passage 136' to a certain distance outside the rearview mirror body 11' and connected to the camera holder 32' that is suspended outside the rearview mirror body 11'.

Thus, in this second embodiment, through the arrangement of the first camera module 21' and the second camera module 31', the automobile rearview mirror with driving video recording function 10' can capture front-view and rear-view video images, making the invention more perfect in video recording during driving.

Figure 12:
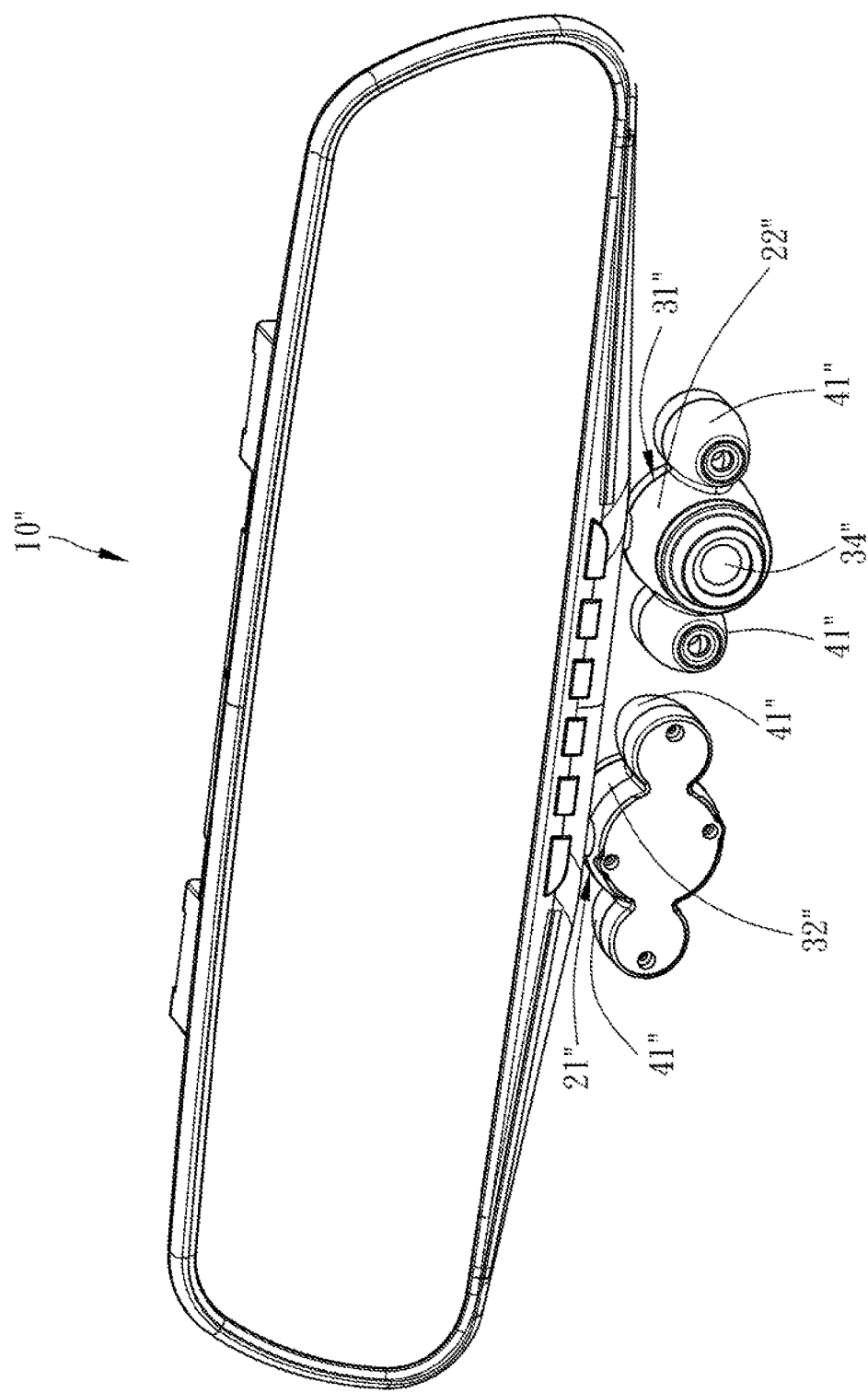
FIG. 12 is an oblique front elevational view of an automobile rearview mirror with driving video recording function in accordance with a third embodiment of the present invention.

Referring to FIGS. 12 and 13, an automobile rearview mirror with driving video recording function 10" in accordance with a third embodiment of the present invention is shown. This third embodiment is substantially similar to the aforesaid first embodiment with the exceptions as follows:

The first camera module 21" and the second camera module 31" each further comprise at least one light source 41". In this third embodiment, the first camera module 21" and the second camera module 31" each comprise two light sources 41" respectively located at the two opposite lateral sides of the camera holder 22" of the first camera module 21" or the camera holder 32" of the second camera module 31". The light sources 41" can be configured to emit infrared light or white light according to actual requirements.

Thus, in this third embodiment, the arrangement of the light sources 41" on the camera holders 22",32" of the first camera module 21" and second camera module 31" at two opposite lateral sides an effectively enhances the light sensitivity of the first camera module 21" and the second camera module 31" while driving, improving the image-capturing quality.

What is claimed is:

1. A rearview mirror attachment having recording functionality for removably coupling to a face of an existing automobile rearview mirror, wherein said automobile review mirror includes a top and bottom edge and backward facing surface, said attachment comprising:
   a rearview mirror body comprising a housing and a mirror mounted in said housing, said housing comprising a first pivot holder and a second pivot holder, said first pivot holder and said second pivot holder each defining therein a ball socket and a position-limiting passage in communication with said ball socket, each said position limiting passage being an open-ended passage facing downwards and having an inner diameter gradually increased toward an open end thereof;
   a first camera module comprising a camera holder, an image capture device mounted in said camera holder and adapted for capturing outside video images, a connection rod extended from a top side of said camera holder and terminating in a ball, said connection rod having a substantially uniform circumference, wherein said ball being coupled to said ball socket of said first pivot holder in a tight-fit manner so that said ball is rotatable relative to said ball socket to the desired angular position by an external force and then positively positioned in the adjusted angular position after said external force is disappeared, wherein the uniform connection rod is capable of being adjusted within the position-limiting passage off-axis from mechanical center of said position-limiting passage, said connection rod being extended through said position-limiting passage to a certain distance outside said rearview mirror body to suspend said camera holder outside said rearview mirror body
   wherein the ball further comprises a pin protrusion; and
   the ball socket further comprises a corresponding pin opening except in one location where the ball socket comprises a pin arresting surface configured so that the maximum rotation of the camera holder about the yaw axis cannot be greater than 360°.

2. The automobile rearview mirror with driving video recording function as claimed in claim 1, further comprising a second camera module, said second camera module comprising a camera holder, an image capture device mounted in the said camera holder of the said second camera module and adapted for capturing outside video images, a connection rod extended from a top side of the said camera holder of the said second camera module and terminating in a ball, the said ball of the said second camera module being coupled to the said ball socket of the said second pivot holder in a tight-fit manner so that the said ball of the said second camera module is rotatable relative to the said ball socket of the said second camera module to the desired angular position by an external force and then positively positioned in the adjusted angular position after said external force is disappeared, the said connection rod of the said second camera module being extended through the said position-limiting passage of the said second pivot holder to a certain distance outside said rearview mirror body to suspend the said camera holder of the said second camera module outside said rearview mirror body.

3. The automobile rearview mirror with driving video recording function as claimed in claim 2, wherein said first camera module and said second camera module each further comprise at least one light source.

4. automobile rearview mirror with driving video recording function as claimed in claim 3, wherein said first camera module and said second camera module each comprise at least two light sources respectively located at two opposite lateral sides of the respective said camera holders of said first camera module and said second camera module.

5. The automobile rearview mirror with driving video recording function as claimed in claim 4, wherein said light sources are selectively configured to emit infrared light or white light.

6. The automobile rearview mirror with driving video recording function as claimed in claim 1 wherein the camera holder can be positioned up to 75° off of the neutral position in either the Roll, Pitch, or combined Roll & Pitch directions and maintained at that position after the external force is disappeared.

* * * * *